United States Patent [19]

Lee et al.

[11] Patent Number: 4,600,751

[45] Date of Patent: Jul. 15, 1986

[54] HYDROPHILIC SILICONE-ORGANIC COPOLYMER ELASTOMERS

[75] Inventors: Chi-long Lee, Midland, Mich.; Wen-Bin Shyu, Chagrin Falls, Ohio

[73] Assignee: Dow Corning Corporation, Midland, Mich.

[21] Appl. No.: 683,308

[22] Filed: Dec. 18, 1984

[51] Int. Cl.$^4$ .............................................. C08L 83/12
[52] U.S. Cl. .................................. 525/404; 525/489; 526/279; 528/26; 528/28
[58] Field of Search ................ 525/479, 404; 528/26, 528/28

[56] References Cited

U.S. PATENT DOCUMENTS

| | | | |
|---|---|---|---|
| 3,484,394 | 12/1969 | Holdstock | 260/3 |
| 4,136,250 | 1/1979 | Mueller et al. | 525/479 |
| 4,235,985 | 11/1980 | Tanaka et al. | 526/279 |
| 4,260,725 | 4/1981 | Keogh et al. | 528/26 |
| 4,309,529 | 1/1982 | Wendling | 528/289 |
| 4,320,221 | 3/1982 | Hoffman | 528/69 |
| 4,369,300 | 1/1983 | Carter et al. | 528/28 |
| 4,486,577 | 12/1984 | Mueller et al. | 525/474 |
| 4,496,210 | 1/1985 | Ansel et al. | 350/96.3 |

FOREIGN PATENT DOCUMENTS 108886 5/1984 European Pat. Off. .
127321 5/1984 European Pat. Off. .

*Primary Examiner*—Wilbert J. Briggs, Sr.
*Attorney, Agent, or Firm*—Richard E. Rakoczy

[57] ABSTRACT

This invention provides compositions which are curable to hydrophilic, water-absorbing silicone-organic copolymer elastomers via free radical polymerization such as by the use of free radical precursors, UV or electron beam. The compositions are mixtures of (A) from 50 to 95 parts by weight of block copolymers containing polydiorganosiloxane segments and polyalkyleneoxy segments which block copolymers contain terminal aliphatically unsaturated groups such as those derived from the reaction of isocyanoethyl methacrylate with terminal free hydroxyl groups present on the polyalkyleneoxy segments and (B) from 5 to 50 parts by weight of at least one substantially water insoluble aliphatically unsaturated organic monomer which is compatible with (A) such as methyl methacrylate. The cured elastomers, some of which are optically clear, are useful as membranes for gas or fluid separations or for the controlled release of bioactive agents such as insecticides or herbicides.

24 Claims, No Drawings

HYDROPHILIC SILICONE-ORGANIC COPOLYMER ELASTOMERS

BACKGROUND OF THE INVENTION

This invention relates to compositions which are curable to hydrophilic, water-absorbing silicone-organic copolymer elastomers via free-radical polymerization. The hydrophilic elastomers are useful as membranes for gas and other fluid separations.

Polydiorganosiloxane elastomers such as those which are predominantly polydimethylsiloxanes typically exhibit high permeability to various types of gases as compared with organic elastomers. Polydimethylsiloxane elastomers generally possess hydrophobic surfaces (i.e., water-in-air contact angles of greater than about 80° at 25° C. and more typically in the range of 95°–110°) due to the hydrophobic character of the polydimethylsiloxane chains forming the elastomer. As a result of their hydrophobic character, such elastomers tend to permit non-polar fluids and compounds to pass more readily through the elastomer than polar fluids such as water. It would be desirable to obtain an elastomer which possessed some of the high permeability characteristics of silicone elastomers, but which is hydrophilic and water-absorbing in nature, so as to more readily allow polar materials such as water, alcohols and polar bioactive agents such as insecticides or herbicides to pass through the elastomer. The hydrophilic character such as water-in-air contact angle and water absorbancy should be modifiable so as to enable one to adjust the rate at which a particular compound will permeate through the elastomer. If the hydrophilic, water-absorbing elastomer is to be used as a membrane for fluid separation, the elastomer should retain as much as possible of its original unhydrated physical properties such as tensile strength, elongation and tear strength after being hydrated and allowed to absorb water.

Attempts to provide such elastomers have been made in the past, particularly in the field of eye contact lenses where an oxygen permeable, soft, hydrophilic elastomeric material is desirable. U.S. Pat. No. 4,136,250 to Mueller, et al. (issued 1/23/79) and hereby incorporated by reference provides a water-insoluble hydrophilic gel comprising about 20 to 90% by weight of (1) a hydrophilic (a) polymer of identical or different water-soluble monoolefinic monomers or (b) copolymer of said water-soluble monomers with 1 to 80% (of total monomers) of water insoluble, identical or different monoolefinic monomers; ingredient (1) is cross-linked with (2) about 10 to 80% by weight of a terminal polyolefinic siloxane macromer having a molecular weight of from about 400 to about 8500 to form a gel. Unlike the curable composition and hydrophilic elastomers of the present invention, Mueller, et al. teach that the siloxane macromer is the hydrophobic portion of the gel product and provides flexible cross-links and improved oxygen permeability. A water soluble monoolefinic monomer is required to be present as at least 20% by weight of the total monoolefinic monomers used to form the Mueller, et al. hydrogel. As will be described, we have discovered that the polysiloxane component of certain compositions can act as the hydrophilic portion within certain limits and have therefore found that substantially water insoluble aliphatically unsaturated monomers can be used to the exclusion of water soluble monoolefinic monomers to obtain hydrophilic, water-absorbing silicone elastomers which are oxygen permeable.

U.S. Pat. No. 4,235,985 to Tanaka, et al. (issued 11/25/80) teaches copolymers for contact lenses which are a copolymer of a organosiloxane monomer which contains a pendant hydroxyl radical for hydrophilicity and may optionally contain a polyether group (to improve the hydrophilicity of the copolymer) and a hydrophobic methacrylic acid alkyl ester. The copolymer is said to be hydrophilic, but is hard and is substantially non-water absorptive unlike the water-absorbing elastomers of the present invention. The organosiloxane monomer is employed to provide both oxygen permeability and hydrophilicity, but differs in structure from those employed in the present invention.

U.S. Pat. No. 4,260,725 to Keogh, et al. (issued 4/7/81) teaches a water-absorbing, soft, hydrophilic, flexible contact lens which is oxygen permeable. It teaches a copolymer of organic monomers which may or may not have hydrophilic groups such as hydroxyl groups present therein with a polysiloxane which is alpha, omega-terminally bonded through divalent hydrocarbon groups to polymerizably activated unsaturated groups and which polysiloxane has hydrophilic sidechains. Keogh, et al. fails to teach the polysiloxanes employed in the present invention. When polyether sidechains are used by Keogh, et al., they prefer methoxy end-capped polyether sidechains. This differs from the aliphatically unsaturated terminal groups employed in the present invention which enable the entire polysiloxane block copolymer to form the elastomer and thereby contribute to the retention of physical properties after absorbing water. Furthermore, Keogh, et al. make no distinction between the use of water soluble monomers such as 2-hydroxyethylmethacrylate versus substantially water insoluble organic comonomers such as methyl methacrylate in their compositions while the present invention employs substantially water insoluble organic monomers. These latter monomers are employed in the present invention to obtain cured elastomers with desirable physical strength and resistance to tearing after absorption of water.

SUMMARY OF THE INVENTION

It is one object of this invention to provide a composition curable to a hydrophilic (i.e., water-in-air contact angle of no greater than 80° at 25° C. after hydration after being cured against a chromed steel substrate) silicone-organic copolymer which is capable of absorbing at least 3% by weight of water based upon the total dry weight of the elastomer. The composition is composed of from 50 to 95 parts by weight of a polydiorganosiloxane polyether block copolymer and from 5 to 50 parts by weight of one or more substantially water insoluble aliphatically unsaturated organic monomers. The block copolymer portion provides gas permeability, flexibility and hydrophilicity while the organic portion derived from the unsaturated monomer provides improved physical properties before and after hydration. When polyether blocks are pendant from a silicon atom present in the polydiorganosiloxane segment of the block copolymer, the terminal end is capped with an aliphatically unsaturated radical for copolymerization with the organic monomer. This results in a copolymer wherein all of the hydrophilic polyether segments are tied into the copolymer network thus contributing to the elastomeric properties of the copolymer in addition to serving to render the copolymer hydrophilic and water absorbing.

It is another object of this invention to provide a hydrophilic, water absorbing silicone-organic copolymer elastomer which is permeable and useful as a membrane for gas and fluid separations. It is also an object of this invention to provide hydrophilic elastomers which are capable of releasing materials such as bioactive agents (e.g., insecticides and herbicides) at a controlled rate. The release rate can be controlled by the choice of polysiloxane and polyether segments to vary the hydrophilic character of the copolymer elastomer.

DETAILED DESCRIPTION OF THE INVENTION

These and other objects of the present invention are provided by a composition curable to a hydrophilic, water absorbing silicone-organic copolymer elastomer consisting essentially of (A) from 50 to 95 parts by weight of a block copolymer of the formula

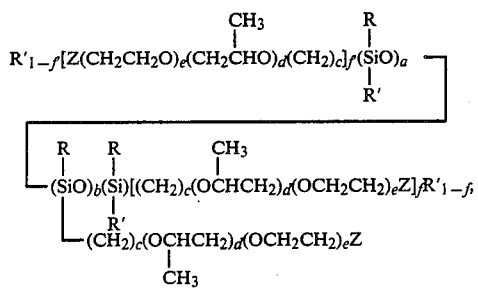

wherein
a is an integer of from 4 to 49, inclusive,
b is an integer of from 0 to 15, inclusive,
c is an integer having a value of from 2 to 4, inclusive,
d is an integer of from 0 to 25, inclusive,
e is an integer of from 5 to 50 inclusive
d+e is no greater than 50 and e is greater than or equal to d,
f is 0 or 1,
f' is 0 or 1,
f+f'+b is at least 2,
R is a monovalent hydrocarbon or halohydrocarbon radical of from 1 to 6 inclusive carbon atoms which is free of aliphatic unsaturation,
R' is a methyl or a phenyl radical,
Z is a monovalent radical selected from the group consisting of $CH_2=CR''COOR'''NHCOO-$, and $CH_2=CR''COO-$,
R'' is an alkyl radical of from 1 to 4 inclusive carbon atoms or hydrogen,
R''' is a divalent hydrocarbon radical of from 1 to 6 inclusive carbon atoms, and (B) from 5 to 50 parts by weight of at least one substantially water insoluble aliphatically unsaturated organic monomer which is compatible with said (A), wherein upon curing said composition, an elastomer is obtained which is hydrophilic and capable of absorbing at least 3% by weight of water based upon the total weight of said elastomer before exposure to water.

This invention also relates to the copolymer elastomers obtained upon curing such compositions and to membranes formed from such copolymer elastomers.

The block copolymers employed in the present invention are preferably produced by reacting silicone polyether block copolymer prepolymers such as those of the formula

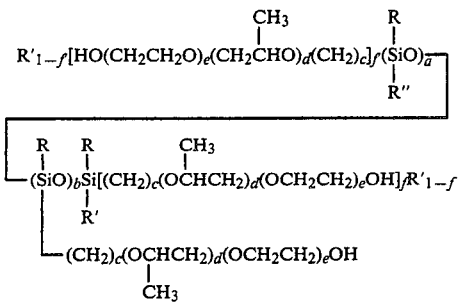

with aliphatically unsaturated compounds of the formula $CH_2=CR''COOR'''NCO$, or $CH_2=CR''COX$ to produce a block copolymer wherein X is a hydrolyzable radical, preferably a chlorine radical. R'' can be methyl, ethyl, propyl, butyl or hydrogen and is preferably a methyl radical. Examples of aliphatically unsaturated compounds useful for reaction with the prepolymers are isocyanatoethyl methacrylate ($CH_2=C(CH_3)COO(CH_2)_2NCO$), isocyanatoethyl acrylate, methacryloyl chloride and acryloyl chloride. The isocyanate compounds are preferred since they provide a one step addition to the prepolymers under mild reaction conditions in the presence of a catalyst such as an organotin catalyst without generating by-products. 0.02% of dibutyltin dilaurate based upon the total amount of block copolymer prepolymer and isocyanate compound was found to work well with the above block copolymer prepolymers and isocyanatoethyl methacrylate. Most preferred is isocyanotoethyl methacrylate.

The prepolymers themselves are well known in the art as exemplified by U.S. Pat. Nos. 2,868,824 (Haluska, 1/13/1959); Re 25,727 (Haluska, reissued 2/9/1965); 3,246,048 (Haluska, issued 4/12/1966); 3,560,544 (Haluska, issued 2/2/1971) and 3,957,843 (Bennett, issued 5/18/76) which are hereby incorporated by reference to teach prepolymers useful in preparing compositions of the present invention. For example, prepolymers for preparing the block copolymers are taught in U.S. Pat. No. Re. 25,727 and a linear dimethylsiloxane prepolymer containing two terminal polyethyleneoxide segments with terminal hydroxyl groups is commercially available. It is well known that block copolymers are typically a mixture of block copolymers of varying chain lengths having the previously described structure and the overall block copolymer composition is typically described as one wherein the average chain length of segments such as polyethyleneoxy units in the block copolymer composition is referred to by an integer such as "e is an integer of from 5 to 50" in the foregoing formula. The block copolymers of the present invention also contain substituted siloxy units (designated by the subscripts "a" and "b" which may be indiscrete blocks of, e.g., several (RR'SiO) units or may contain (R'RSiO)

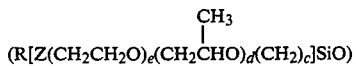

units along the same linear polysiloxane chain.

As can be seen from the foregoing formulas, each R can be a hydrocarbon or a halohydrocarbon radical of from 1 to 6 inclusive carbon atoms which is free of aliphatic unsaturation such as methyl, ethyl, propyl, hexyl, cyclohexyl, chloromethyl, 3,3,3 trifluoropropyl or 1,1,1-trifluorohexyl radicals. Preferably R is selected from the group consisting of methyl, phenyl and 3,3,3-trifluoropropyl radicals. For highest permeability to gases such as oxygen, R and R' are most preferably methyl radicals.

To obtain a hydrophilic, water-absorbing silicone-organic copolymer elastomer, the block copolymer must contain a sufficient amount of hydrophilic ether (alkyleneoxy) units to overcome the hydrophobic character contributed by the polysiloxane segments and by the organic polymer segments derived from the unsaturated monomers. A polysiloxane segment consisting of about 50 siloxy units which do not contain hydrophilic polyether segments is about the maximum which can be present and still obtain a hydrophilic surface having a water-in-air contact angle of no greater than about 80° at 25° C. when molded against chromed steel. This is particularly true when the block copolymer contains only two terminal polyether chains which is a preferred block copolymer (i.e., b=0). To obtain the best elastomeric properties, it is preferred that a block copolymer be employed wherein a is an integer of from 8 to 14 inclusive, c is 3 or 4, and e is an integer of from 10 to 15 inclusive. Since the ethyleneoxy —(OCH$_2$CH$_2$)— unit is more hydrophilic than the propyleneoxy

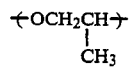

unit, the ratio of these units in the chain can be varied to modify the hydrophilicity and water absorption of the elastomer. If more than one half of the alkyleneoxy units present in the polyether segment are propyleneoxy units, the hydrophilicity of the elastomer may be compromised. For this reason, it is best that d be no greater than 25 and that the value of e be greater than or equal to d. Preferably, d=0 and the hydrophilicity and water absorption of the elastomer is varied by controlling the number and ratio of ethyleneoxy units to RR'SiO units in the polydiorganosiloxane segments. The polyether segments should not consist of more than 50 alkyleneoxy units, (i.e., the sum of d+e should be no greater than 50).

The permeability of the elastomer can also be controlled by varying the number and ratio of alkyleneoxy units to RR'SiO units. Block copolymers wherein b has a value of greater than 2 will tend to form more tightly cross-linked, less elastomeric copolymers than block copolymers wherein f+f'+b=2. It is best to minimize the amount of block copolymers wherein f+f'+b is greater than 2 in the composition to obtain the best elastomeric properties, particularly elongation values. The gas permeability of the cured elastomer begins to rapidly decrease for a given ratio of block copolymer to organic monomer as the siloxane unit content of the block copolymer is decreased. 50 parts of block copolymer per 100 parts total block copolymer and organic monomer appears to be about the minimum necessary to retain a reasonable amount of gas permeability. When the block copolymer content of the elastomer is increased to about 95 parts, the physical properties of the cured elastomer tend to become poor. The water absorption of the elastomer should be at least 3% by weight of water based upon the total weight of the dry cured elastomer before exposure to water. The water absorption of the cured elastomer will be dependent upon the polyalkyleneoxy content of the block copolymer. An increase in polyalkyleneoxy content of the block will generally increase the water absorption of the cured elastomer for a given ratio of block copolymer and organic monomer.

The block copolymers are copolymerized with from 5 to 50 parts by weight of at least one substantially water insoluble aliphatically unsaturated organic monomer which is compatible with the block copolymer. The term "compatible" is intended to mean that the block copolymer and organic monomer are sufficiently miscible and free radical polymerizable with each other that they are capable of forming a substantially crosslinked copolymer rather than being substantially a mixture of two homopolymers. A copolymer provides better physical properties. By "substantially water insoluble", it is meant that the monomer does not contain free hydroxyl radicals, polyalkyleneoxy radicals, carboxyl radicals, amine radicals or other radicals which by themselves or as salts render the monomer water soluble. Examples of water soluble monomers are 2-hydroxyethylmethacrylate and N-vinyl pyrrolidone. Examples of monomers which are substantially water insoluble include the hydrocarbon esters of acrylic and methacrylate acid such as methyl acrylate, methyl methacrylate, ethyl acrylate, butyl acrylate and cyclohexyl methacrylate, styrene, alphamethylstyrene, para-methylstyrene, vinyl acetate, vinyl propionate, allyl ether, and acrylonitrile. Preferably, such monomers are of the formula

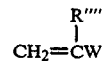

wherein W is selected from the group consisting of —COOR'''', —OOCCH$_3$ and —C$_6$H$_5$ wherein R'''' is an alkyl radical of from 1 to 6 inclusive carbon atoms such as methyl methacrylate, methyl acrylate, vinyl acetate and styrene. More preferably, the monomers are methyl methyacrylate, styrene or mixtures of both. Methyl methacrylate is most preferred. When higher tensile strength and tear resistant hydrophilic elastomers are desired such as for use as for example, membranes, it is preferable that from 30 to 50 parts by weight of the total weight of block copolymers and substantially water insoluble aliphatically unsaturated organic monomers present in the composition be such organic monomers.

The block copolymer and organic monomers are homogeneously blended together to form a composition which is then cured to a hydrophilic elastomer by exposing the composition to free radical polymerization conditions. Thus, the compositions can be cured by exposing them to heat ultraviolet radiation, electron beam radiation, or other forms of ionizing radiation. If ultraviolet radiation is employed, it can be desirable to include an effective amount of a photoinitiator such as benzophenone with or without a promoter such as an amine such as dimethyl aniline in the composition before curing.

Free radical polymerization can also be initiated by further including from 0.1 to 10 parts by weight of a free radical initiator per 100 parts by weight of block copolymers and organic monomers in the composition. 0.1 parts of initiator per 100 parts of block copolymer and organic monomer was found to work well as shown in the Examples. The composition containing a free radical initiator can then be cured by heating the composition to a temperature which is sufficient to initiate production of free radicals or else simply by quickly adding the free radical initiator if it produces free radicals at room temperature. Examples of useful free radical initiators are peroxides such as 2,5-bis-(t-butylperoxy)-2,5-dimethyl hexane, tert-butyl peroxy-2-ethylhexanoate (also known as "tert-butyl peroctoate"), benzoyl peroxide, methyl ethyl ketone peroxide and azo compounds such as 2,2-azo-bis-isobutyronitrile and 2,2'-azo-bis-(2,4-dimethylvaleronitrile). Because the organic monomers tend to be volatile, it is best to at least initially cure the compositions at temperatures which are no greater than about 200° C. and under conditions which tend to inhibit escape of the unreacted monomer such as in a closed mold. Post curing at higher temperatures may be accomplished after the initial cure since most of the volatile organic monomers should have been copolymerized in the initial curing step. Heat/press cures at 100°-175° C. for 15 minutes to 2 hours followed by a postcure at 100° 150° for 15 minutes to one hour produced acceptable cured elastomers as shown in the following Examples.

Nonreactive solvents can be added to reduce the viscosity of the compositions, but it is best to rely on the organic monomers to reduce the viscosity of the compositions. Aqueous emulsions formed from the curable compositions of the present invention are the subject of our copending U.S. Patent Application Ser. No. 683,303, now U.S. Pat. No. 4,584,337, entitled "Aqueous Emulsions Containing Hydrophilic Silicone-Organic Copolymers" filed concurrently herewith in the names of Chi-long Lee and Wen-Bin Shyu and assigned to the same assignee as is the present invention.

The term "consisting essentially of" as used in this Specification and the accompanying claims is intended to mean that the combination of block copolymers and substantially water insoluble organic polymers to provide hydrophilic, water-absorbing silicone-organic copolymer elastomers forms the basis for the present invention. If desired, other additional ingredients which do not affect the hydrophilic, water absorbing character of the cured elastomers can be added to the aforementioned compositions. Examples of such additional ingredients can be silica and other fillers, fiber reinforcement, antioxidants, pigments, dyes and colorants and the like.

Because the permeability and the water absorption of the cured elastomers can be varied, the cured elastomers are suitable as selectively permeable membranes useful, for example, in gas or fluid separations such as in separating oxygen from nitrogen or for altering the ratio of water to methanol in water/methanol mixtures. Likewise, bioactive agents such as insecticides, larvicides, acaricides and herbicides or fertilizers could be incorporated within the curable compositions of the present invention and the compositions can then be cured to form hydrophilic, water absorptive elastomers capable of releasing the agents included therein over a period of time which is dependent upon the composition of the elastomer. Because one of the cured elastomer formulations (See Example 8) exhibited reactions in tissue culture testing thought to be due to unreacted components present in the block copolymer, appropriate safety and efficacy testing should be undertaken before employing these elastomers for uses involving contact with animals and humans. Some of the elastomers were optically clear after hydration and can find use in applications where transparent elastomers are required such as coatings for glass or for fabric treatments.

In the following Examples, the advancing water-in-air contact angles were measured using a sessile drop method at room temperature (about 21°±2° C.) on dry (unhydrated) samples of the cured elastomer using a distilled water drop. The elastomer was molded in a chrome-plated steel molding chase and was then washed with ethanol and dried to remove any low molecular weight components which might rise to the surface during cure of the elastomer before the drop of water was applied. The measurement was completed within about 2-6 minutes from the application of the water drop to the elastomer. The instrument used was a NRL Contact Angle Goniometer, Model No. A-100 which is a product of Rame-Hart, Inc., Mountain Lake, N.J.

The percent water absorption and the percent volume swelling of the cured elastomers was measured by molding a nominal 1 inch by 1 inch by 0.06 inch (25 mm×25 mm×1.5 mm) slab of elastomer and thereafter measuring the exact dimensions and weight of the dry (unhydrated) slab. The slab was then immersed and stored in distilled water for at least 3-5 days at room temperature and was then removed, immediately blotted lightly and weighed and the exact dimensions were again recorded for the slab in its hydrated state. The percent water absorption reported was calculated as follows $$\frac{W_H - W_U}{W_U} \times 100 = \text{percent water absorption}$$

where $W_H$ is the weight of the slab after hydration and $W_U$ is the dry (unhydrated) weight.

The physical properties of the cured elastomers were measured on unhydrated (unless otherwise indicated) samples using the following ASTM Methods: ASTM D412—ultimate tensile strength (tensile stress) and elongation at break; ASTM D624—tear (Die B) and ASTM D2240—durometer (Shore A). The physical properties reported are the average properties of at least two samples.

The luminous transmittance values and the percent haze values per 100 mils of sample thickness were measured according to the procedure described in ASTM D1003-61. A Hunterlab Model D55H Hazemeter (Hunter Associates Laboratory, Inc., Reston, VA 22090) which employed CIE Source C was used to obtain the haze and luminous transmittance values.

The gas permeability value at room temperature (about 21±2° C.) of a thin slab of the elastomer to gases such as oxygen was measured using an instrumental method which is described in U.S. Pat. No. 4,198,131 to Birdsall et al. and the relevant portions of that patent are hereby incorporated by reference to teach that method. The permeability value for a particular gas can also be obtained using the "Dow Cell" method described in ASTM D1434-75.

The following Examples are illustrative only and should not be construed as limiting the invention which is properly delineated in the appended claims.

EXAMPLES 1-10

The following general procedure was used to prepare the curable compositions used in Examples 1-10. The silicone polyether block copolymer prepolymer ("BCP-1") employed was predominantly composed of block copolymer prepolymers of the formula

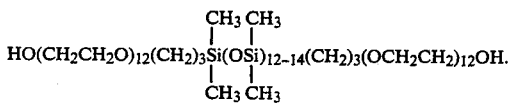

A stoichiometric amount plus 5% of isocyanatoethyl methacrylate ("IEM") based upon the moles of hydroxyl radicals present in the block copolymer prepolymer (based upon the measured hydroxyl content) was added to a selected amount of the prepolymer at room temperature along with a catalytic amount of triethylamine ("Et$_3$N") or dibutyltin dilaurate ("DBTDL") to promote the addition of the isocyanate groups of the isocyanatoethyl methacrylate to the terminal free hydroxyl groups present in the polyether segment of the prepolymer. The mixture was stirred without heating for ten minutes while the temperature of mixture was kept below 40° C. (the reaction is rapid and exothermic). The reaction mixture was then mixed with 2,5-bis-(t-butylperoxy)-2,5-dimethyl hexane ("Peroxide A") or with tert-butyl peroxy-2-ethylhexanoate ("Peroxide B") and methyl methacrylate monomer ("MMA") as indicated in Table I. Peroxide A was LUPERSOL ® 101 Peroxide which is a product of Wallace & Tiernan, Inc., Lucidol Div., Buffalo, N.Y. 14240. The composition was heat/press cured in a chromed steel molding chase under the conditions described in Table I to obtain a cured elastomer. The molded elastomers of Examples 3-9 were further postcured, removed from the molding chase and in an oven as shown in Table I. Examples 1-2, 3-6, 7-9 and 10 were prepared at different times and different cure schedules were employed. The compositions and cure schedules are described in Table I. The physical properties measured for the cured elastomers of each Example are reported in Table II. Examples 1, 2, 9 and 10 are comparative examples.

The elastomers of Example 1 exhibited a hydrophobic surface and that of Example 2 bordered on being hydrophobic. These two samples were not postcured and the surfaces were not washed with ethanol before the water contact angle was measured. Example 10 was run using DBTDL instead of Et$_3$N and the elastomer was both postcured and washed with ethanol before the water contact angle was measured. The elastomer of Example 10 had a hydrophilic surface when cured against a chromed steel surface. To check on the difference in water contact angle values between Examples 1 and 10 and also to check the effect of the substrate against which the elastomer is cured has on the water contact angle, Example 10 was repeated, but was cured against a cellulose acetate substrate. A water contact angle of 52° was obtained. Example 1 was repeated by molding against a cellulose acetate substrate with the additional steps of postcuring the elastomer for 15 minutes at 150° C. and thereafter rinsing the surface in ethanol and allowing it to air dry using a compressed air stream. The water contact angle of elastomer obtained was 95° which was still considered to be hydrophobic. Thus the more polar cellulose acetate substrate resulted in a decrease in contact angle relative to the elastomer cured against chromed steel, but Example 1 still remained hydrophobic. It therefore appears that the substrate against which the composition is cured can affect the hydrophilicity of the surface cured elastomer.

From the data in Table II, it can be seen that the addition of MMA to the curable compositions results in an increase in durometer value of about 20 points and the physical properties of the elastomers in Examples 3-8 increase with increasing levels of MMA. At 80 parts of MMA per 100 parts of BCP-1 and MMA (Example 9), the tensile strength of the elastomer is more than double that of Example 8, but the elongation value is about one third the value of Example 8. Based upon the water absorption values obtained for Example 6-8, it appears that the ability of the cured elastomers to absorb water also decreases as the level of MMA is increased.

The gas permeability of the cured elastomers of Examples 7 and 8 were measured for oxygen ($P_O$) and nitrogen ($P_N$) and the values obtained at room temperature are reported in units of $$\frac{cm^3 \cdot cm}{cm^2 \cdot sec \cdot cm\ Hg}$$

The following values were obtained: Example 7-$P_O=2.44\times10^{-9}$, $P_N=0.807\times10^{-9}$ and $P_O/P_N=3.02$ and Example 8 - $P_O=0.895\times10^{-9}$, $P_N=0.263\times10^{-9}$ and $P_O/P_N=3.4$. As expected, the gas permeability of the elastomer decreases as the amount of MMA is increased relative to the total composition. W. L. Robb reports in Ann. N.Y. Acad. Sci., volume 146(1), (1968) on page 119 that the $P_O$ of dimethyl silicone rubber is $60\times10^{-9}$ while relatively impermeable plastics such as polystyrene have a $P_O$ of $0.12\times10^{-9}$. Polymethylmethacrylate is also relatively impermeable to gases. From the above data, it appears that the use of more than 50 parts of MMA based on the total amount of MMA and BCP-1 would have a detrimental effect on the $P_O$ of the cured elastomers of this series and result in an elastomer with greatly reduced permeability. The selectivity of the elastomer to oxygen and nitrogen ($P_O/P_N$ value) increases as more MMA is included, but the permeability of the elastomer to both gases decreases. The cured elastomer of Example 8 could be used as a membrane for the separation of oxygen from nitrogen.

Each of the elastomers of Examples 6-8 were found to be transparent as evidenced by the following luminous transmittance values (the first value) and % haze at 100 mil (2.54 mm) thickness (the second value): Example 6-93.0%, 2.0%; Example 7-92.6%, 6.2%; and Example 8-92.3%, 2.9%. Examples 6 and 8 would be considered as being optically clear since their haze value is less than 4% per 100 mil (2.54 mm) thickness and the luminous transmittance is greater than 85%. The cured elastomer of Example 8 was found to have a glass transition temperature of −58° C., as measured by torsional braid analysis.

Compositions similar to that of Example 8 were tested, in vitro, by placing samples of the cured elastomer and extracts from the cured elastomer in direct contact with a monolayer of human embryonic foreskin cells (type HR 218) incubated at 37° C. in a humidified 5% carbon dioxide atmosphere for 24 hours. The material and the extracts exhibited a cytopathic effect thought to be due to the presence of the unreacted allyl polyethyleneoxide used to prepare the block copolymer. The allyl polyethyleneoxide exhibited a cytopathic effect in direct contact with the cells while the H(CH$_3$)$_2$SiO endblocked polydimethylsiloxane did not.

room temperature according to the procedure described in ASTM D-1653 using a Payne Permeability Cup, purchased from Fisher Scientific Co, 711 Forbes Avenue, Pittsburgh, Pa. 15219. The permeability of that

TABLE I

| Example | 1 | 2 | 3 | 4 | 5 | 6 | 7 | 8 | 9 | 10 |
|---|---|---|---|---|---|---|---|---|---|---|
| Composition | | | | | | | | | | |
| BCP-1 (g) | 20 | 20 | 100 | 100 | 100 | 100 | 100 | 100 | 100 | 100 |
| IEM (g) | 3.83 | 3.83 | 15.5 | 15.5 | 15.5 | 15.5 | 15.5 | 15.5 | 15.5 | 15.5 |
| Et$_3$N (g) (1) | 0.02 | 0.02 | — | — | — | — | — | — | — | — |
| DBTDL (g) | — | — | 0.024 | 0.026 | 0.027 | 0.02 | 0.02 | 0.02 | 0.02 | 0.023 |
| Peroxide A (g) | 0.09 (2) | 0.09 (2) | — | — | — | — | — | — | — | 0.012 |
| Peroxide B (g) | — | — | 0.122 | 0.128 | 0.136 | 0.1 | 0.1 | 0.1 | 0.1 | — |
| MMA (g) | — | — | 6.1 | 12.8 | 20.4 | 38.5 | 49.5 | 77 | 462 | — |
| % Block Copolymer | 100 | 100 | 95 | 90 | 85 | 75 | 70 | 60 | 20 | 100 |
| % MMA | 0 | 0 | 5 | 10 | 15 | 25 | 30 | 40 | 80 | 0 |
| % (CH$_3$)$_2$SiO | 46 | 46 | 38 | 36 | 34 | 32 | 30 | 28 | 8 | 46 |
| Cure: | | | | | | | | | | |
| Heat/Press (3) | A | A | B | B | B | D | D | D | B | G |
| Postcure (3) | — | — | C | C | C | E | E | E | F | H |

(1) Added as drops weighing about 0.01 g per drop.
(2) Added as drops weighing about 0.015 g per drop.
(3) A = 15 min. at 175° C.; B = 1 hour at 100° C.; C = 30 min. at 110° C.; D = 2 hours at 100° C.;
E = 1 hour at 150° C.; F = 30 min. at 100° C.; G = 10 min. at 50°–100° C. followed by 15 min at 150°–175° C.; H = 15 min. at 150° C.

TABLE II

| Example | 1 | 2 | 3 | 4 | 5 | 6 | 7 | 8 | 9 | 10 |
|---|---|---|---|---|---|---|---|---|---|---|
| % MMA | 0 | 0 | 5 | 10 | 15 | 25 | 30 | 40 | 80 | 0 |
| Physical Properties: | | | | | | | | | | |
| Durometer (Shore A) | 41 | 40 | 63 | 62 | 62 | 62 | 73 | 87 | — | — |
| Tensile Strength (p.s.i./MPa) (1) | — | — | 100/ 0.69 | 150/ 1.03 | 240/ 1.65 | 440/ 3.03 | 825/ 5.69 | 1370/ 9.45 | 2800/ 19.3 | — |
| Elongation at Break (%) | — | — | 15 | 25 | 50 | 100 | 120 | 140 | 45 | — |
| Tear Strength, Die B [p.p.i./(kN/m)] (2) | — | — | 5/ 0.9 | 7/ 1.2 | 13/ 2.3 | 27/ 4.7 | 58/ 10.2 | 195/ 34.1 | — | — |
| Water Contact Angle (°) | 102 | 80 | 65 | 67 | 63 | — | 65 | 65 | 68 | 64 |
| % Water Absorption | — | — | — | — | — | 22.5 | 17.8 | 16.8 | — | — |
| % Volume Swelling | — | — | — | — | — | 25.3 | 21.0 | 19.2 | — | — |

(1) MPa is megapascals [6.895 MPa = 1,000 pounds per square inch (p.s.i.)].
(2) kN/m is kiloNewtons per meter (175 kN/m = 1,000 p.s.i.).

EXAMPLE 11

In this Example, the cured elastomer of Example 8 was tested to determine its suitability for use as a membrane in an aqueous environment. 60 mil (1.54 mm) thick samples of the cured elastomer of Example 8 were immersed in distilled water at room temperature for 5 days to insure that an equilibrium amount of water had been absorbed by the samples. After the 5 day period, the elastomer was found to have retained its transparency. The following physical properties were measured for the hydrated sample (first figures) as contrasted with the properties obtained for a dry (unhydrated) sample (second figures): Tensile strength—800 p.s.i. (5.5 MPa)/1370 p.s.i. (9.45 MPa); Elongation at Break—90%/140%; Tear Strength (Die B)—80 p.p.i. (14 kN/m)/195 p.p.i. (34.1 kN/m); and Durometer (Shore A)—80/87. Thus, the hydrated elastomer retained a substantial degree of the physical properties possessed by the dry (unhydrated) elastomer.

The permeability of methanol and water vapor through a 24 mil (0.61 mm) thick membrane formed of the cured elastomer of Example 8 was determined at optically clear elastomer was compared with the permeability to methanol and water of 28 mil (0.71 mm) a thick membrane formed from a two-component silicone composition which is room temperature vulcanizable to a transparent silicone elastomer. The platinum-catalyzed polydimethylsiloxane composition employed was SILGARD ® 184 Silicone Elastomer commercially available from Dow Corning Corporation, Midland, Mich. 48640. This composition is used as a potting and encapsulating material and cures to a transparent, hydrophobic silicone elastomer.

The results are reported in Table III. Measurements were taken at two different intervals (2.6 and 3.8 days) and the permeability to each substance was calculated from the loss of water, methanol and water/methanol mixture through the elastomer membrane at room temperature. The liquid being measured was placed in the bottom of the Payne Permeability Cup and was not in actual contact with the membrane being tested. In Table III, P$_w$ is permeability to water and P$_m$ is permeability to methanol in units of $$\frac{\text{milligrams of permeant} \cdot \text{thickness of elastomer in millimeters}}{\text{area of membrane in cm}^2 \cdot 24 \text{ hour period}}$$

It was found that the permeability of the elastomer membrane of the present invention to water and methanol was about double that of the SYLGARD® 184 Silicone Elastomer while the separation factor ($P_m/P_w$) of both elastomers were about the same. It thus appears that the hydrophilic nature of the elastomers of the present invention result in an increase in the permeation rate of polar compounds throught the membrane In this Example, the permeation rate of a water/methanol mixture was doubled while the separation factor remained approximately the same as that of the hydrophobic silicone elastomer. Thus, the cured elastomer of Example 8 could be used as a more efficient membrane for use in the pervaporation separation of water/methanol mixtures.

TABLE III

| Cured Elastomer | Example 8 | | | SILGARD ® 184 | | |
|---|---|---|---|---|---|---|
| Fluid Tested | Water | Water/methanol | Methanol | Water | Water/Methanol | Methanol |
| Original Weight of Fluid (g) (1) | 9.9522 | 8.0515 | 5.3443 | 7.0322 | 6.5680 | 5.2656 |
| Measurement #1: | | | | | | |
| Time (days) (2) | 2.650 | 2.640 | 2.644 | 2.625 | 2.625 | 2.625 |
| Weight Loss (g) (3) | 0.4439 | 1.6780 | 4.3878 | 0.1950 | 0.7696 | 1.8361 |
| Permeability (P) (4) | 10.62 | 40.28 | 105.2 | 5.427 | 21.50 | 51.2 |
| $P_m/P_w$ | 9.91 | | | 9.43 | | |
| Measurement #2: | | | | | | |
| Time (days) (2) | 3.832 | 3.812 | (5) | 3.832 | 3.812 | 3.825 |
| Weight Loss (g) (3) | 0.6859 | 2.53300 | (5) | 0.2795 | 1.1229 | 2.6817 |
| Permeability (P) (4) | 11.35 | 42.13 | (5) | 5.38 | 21.74 | 51.74 |
| $P_m/P_w$ | — | | | 9.62 | | |

(1) Weight of fluid added to Payne Permeability Cup.
(2) Days since cup was filled and sealed with elastomer membrane.
(3) Weight loss of sealed cup.
(4) units are mg · mm/cm² · 24 hr.
(5) The methanol had completely evaporated through the elastomer membrane before the measurement was made.

EXAMPLES 12–16

In these Examples, compositions of the present invention which contained styrene (STY), methyl acrylate (MA) and mixtures of MA and MMA were prepared according to the procedures followed in Examples 3–10. Example 12 had the following composition 100 g BCP-1, 15.5 g IEM, 49.5 g STY, 0.033 g DBTDL and 0.165 g Peroxide B. Example 13 had the following composition: 100 g BCP-1, 15.5 g IEM, 77 g STY, 0.038 g DBTDL and 0.193 g Peroxide B. Example 14 had the following composition: 100 g BCP-1, 15.5 g IEM, 28.9 g MA, 48.1 g MMA, 0.038 g DBTDL and 0.193 g Peroxide B. Example 15 had the following composition: 100 g BCP-1, 15.5 g IEM, 38.5 g MA, 38.5 gm MMA, 0.038 g DBTDL and 0.193 g Peroxide B. Example 16 had the following composition: 100 g BCP-1, 15.5 g IEM, 77 g MA, 0.038 g DBTDL, and 0.193 g Peroxide B. Each composition was cured in a chromed steel molding chase under the conditions described in Table IV.

The cured elastomers of Examples 12 and 13 were visually observed to be transparent and Example 12 had a water-in-air contact angle of 62° which indicates that it is hydrophilic. The contact angle was 71° two minutes after it was placed on the surface, 66° after 4 minutes and 62° after six minutes. This behavior (reduction in contact angle with time) was usually observed for elastomers that were water absorbing. Thus Example 12 which was hydrophilic is also believed to be water absorbing in spite of the use of 30% styrene monomer. It is believed that when the water-in-air contact angles of Examples 13–16 is measured, each will have a contact angle of 80° or less (i.e., are hydrophilic) and, based upon the work with MMA, each will be water absorptive.

TABLE IV

| Example | 12 | 13 | 14 | 15 | 16 |
|---|---|---|---|---|---|
| % Block Copolymer | 70 | 60 | 60 | 60 | 60 |
| % STY | 30 | 40 | — | — | — |
| % MA | — | — | 15 | 20 | 40 |
| % MMA | — | — | 25 | 20 | — |
| Physical Properties: | | | | | |
| Durometer (Shore A) | 56 | 62 | 54 | 53 | 53 |
| Tensile Strength (p.s.i./MPa) | 300/ 2.1 | 720/ 4.96 | 460/ 3.17 | 320/ 2.21 | 160/ 1.10 |
| Elongation at Break (%) | 95 | 155 | 130/ | 105 | 55 |
| Tear Strength (Die B) (p.p.i./kN/m) | 20/ 3.5 | 52/ 9.1 | 26/ 4.6 | 20/ 3.5 | 12/ 2.1 |
| Water Contact Angle (°) | 62 | — | — | — | — |
| Cure: | | | | | |
| Heat/Press (1) | A | C | E | E | E |
| Postcure (1) | B | D | F | F | G |

(1) A = 2 hours at 100° C.; B = 1 hour at 150° C.; C = 1 hour at 100° C.; D = 30 min. at 150° C.; E = 30 min. at 80° C. followed by 30 min. at 100° C.; F = 20 min. at 100° C.; G = 30 min at 100° C.
(2) Cure used for water contact angle measurement is first letter, cure for remainder of physical properties is second letter.

EXAMPLES 17–19

In these Examples, the polyether segment of the block copolymer was altered and the effect of altering this segment was studied. The block copolymer prepolymers employed had the general formula

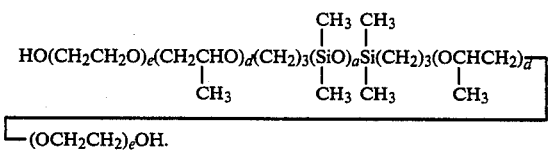

The block copolymer prepolymers were prepared in a conventional manner by reacting an alpha-allylether, omega-hydroxy endblocked polyether with a polydimethylsiloxane endblocked with H(CH₃)₂Si—units in the presence of a platinum catalyst. In Example 17, the block copolymer prepolymer employed (BCP-2) had the foregoing formula wherein e=0, d=1 and a was about 11. Example 17 had the following composition: 100 g BCP-2, 15.5 g IEM, 77 g MMA, 0.038 g DBTDL and 0.193 g Peroxide B. In Example 18, the block copolymer prepolymer employed (BCP-3) had the foregoing formula wherein e was about 5, d=0 and a was about 12 to 14. Example 18 had the following composition: 100 g BCP-3, 20.3 g IEM, 51.6 MMA, 0.172 g DBTDL and 0.172 g Peroxide B. In Example 19, the block copolymer prepolymer employed (BCP-4) had the foregoing formula wherein e and d were each about 24 and a was about 49. Example 19 had the following composition (parts by weight): 100 parts BCP-4, 5 parts IEM, 45 parts MMA, 0.02% DBTDL and 0.1% Peroxide B based upon the total parts of BCP-4, IEM and MMA. The compositions were prepared from the above ingredients as described for Example 3–10, cured according to the following cure schedules: Examples 17–19 were heat/press cured at 100° C. for 1 hour (80°–100° C. for Example 17) and then postcured out of the molding chase for 30 minutes at 110° C. The physical properties obtained are reported in Table V. The results from Example 7 are also included in Table V for comparative purposes.

Example 17 with the least number of polyether units would be considered as being hydrophobic and substantially non-water absorptive. Although pure polymethylmethacrylate homopolymer typically has a water contact angle of from 65°–70°, Example 17 remains hydrophobic although it contains 40% MMA (water contact angle 83°). Example 18 with 5 ethyleneoxy units is at the lower limits of hydrophilicity and water-absorptivity. Example 18 which has a larger number of ethyleneoxy units has a hydrophilic surface even though it contains more than three time the number of dimethylsiloxy units found in Example 17. Water absorption tends to increase with increasing polyether segment length as does the elongation value while tensile strength and tear strength tend to decrease. Examples 18 and 7 were transparent while Example 19 was translucent. Permeability to gases tended to decrease with increasing polyether segment content because the total percentage of siloxane content present in the block copolymer was decreased as the polyether segment content was increased as can be seen by comparing Examples 18 and 7.

TABLE V

| Example | 17 | 18 | 7 | 19 |
|---|---|---|---|---|
| % MMA | 40 | 30 | 30 | 30 |
| Polyether Units - (OCH$_2$CH$_2$)/(OCHCH$_2$)$\vert$CH$_3$ | 0/1 | 5/0 | 12/0 | 24/24 |
| Siloxane Units [OSi(CH$_3$)$_2$] | 12 | 13–15 | 13–15 | 50 |
| Physical Properties: | | | | |
| Durometer (Shore A) | 90 | 85 | 73 | 52 |
| Tensile Strength (p.s.i./MPa) | 1640/11.3 | 1440/9.93 | 825/5.69 | 335/2.31 |
| Elongation at Break (%) | 70 | 80 | 120 | 150 |
| Tear Strength (Die B) (p.p.i./kN/m) | 240/42 | 217/38 | 58/10 | 34/6 |
| Water Contact Angle (°) | 83 | 80 | 65 | 65 |
| Water Absorption (%) | 0.9 | 4.5 | 17.8 | — |
| % Luminous Transmittance - 100 mil | — | 87 | 92.6 | 75.8 |

TABLE V-continued

| Example | 17 | 18 | 7 | 19 |
|---|---|---|---|---|
| (2.54 mm) | | | | |
| P$_O$ (1) | — | 6.85 | 2.44 | — |
| P$_N$ (1) | — | 2.38 | 0.807 | — |
| P$_O$/P$_N$ | — | 2.87 | 3.02 | — |

(1) Figure reported is × 10$^9$ cm$^3$ · cm/cm$^2$ · sec · cm Hg

EXAMPLES 20–21

In these Examples, the effect of polydimethylsiloxane chain length on hydrophilicity, water absorption and physical properties was studied. Example 21 is a comparative example. The block copolymer prepolymer employed had the general formula

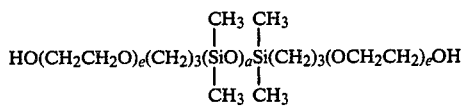

wherein e was about 12. The block copolymer prepolymers were prepared in a conventional manner using a hydrosilylation reaction of the type employed to prepare the prepolymers used in Examples 17–19. In Example 20, the block copolymer prepolymer employed (BCP-5) had the foregoing formula wherein a was about 50. Example 20 had the following composition: 100 g BCP-5, 7.4 g IEM, 46.0 g MMA, 0.153 g DBTDL and 0.153 g Peroxide B. In Example 21, the block copolymer prepolymer employed (BCP-6) had the foregoing formula wherein a was about 100. Example 21 had the following composition: 100 g BCP-6, 3.8 g IEM, 44.5 g MMA, 0.15 g DBTDL and 0.15 g Peroxide B. Each composition was prepared as in Examples 3–10 except the IEM was allowed to react with the BCP-5 for about ninety minutes at room temperature in Example 20 and was allowed to react with the BCP-6 for about two hours at room temperature in Example 21 before adding the MMA and Peroxide B due to the lower hydroxyl content of these block copolymer prepolymers. The compositions were heat/press cured in a chromed steel molding chase for 1 hour at 100° C. followed by a postcure out of the chase for 30 minutes at 110° C. The physical properties of the cured elastomers are reported in Table VI along with those obtained for Example 7 which contained BCP-1 wherein a was about 12–14.

In general, the elastomers tended to take on the character of the polydimethylsiloxane segment as the amount of dimethylsiloxane units present in the block copolymer is increased. This was evidenced by the increase in gas permeability and the decrease in hydrophilicity and water absorption as the dimethylsiloxane unit content was increased. The separation factor for oxygen and nitrogen (P$_O$/P$_N$) obtained for Examples 20 and 21 are close to that of pure polydimethylsiloxane (P$_O$/N$_N$=2.14 per Robb, see discussion for Examples 1–10) even though both cured elastomers are each copolymers containing about 30% MMA added as a monomer. At a dimethylsiloxane unit content of about 50 (Example 20), the cured elastomers appear to be at the lower limit of hydrophilicity with the surface of the cured elastomer of Example 21 being hydrophobic. Examples 7 and 20 were transparent while Example 21 was translucent. Example 7 remained transparent after absorbing water while Example 20 became translucent after being immersed in water for several days. This appears to be due to the higher dimethylsiloxane content of Examples 20 and 21 relative to Example 7.

TABLE VI

| Example | 7 | 20 | 21 |
|---|---|---|---|
| % MMA | 30 | 30 | 30 |
| Polyethyleneoxy Units | 12 | 12 | 12 |
| Siloxane Units [OSi(CH$_3$)$_2$] | 13–15 | 50 | 100 |
| Physical Properties: | | | |
| Durometer (Shore A) | 73 | 75 | 68 |
| Tensile Strength (p.s.i./MPa) | 825/5.69 | 970/6.69 | 830/5.72 |
| Elongation at Break (%) | 120 | 145 | 160 |
| Tear Strength (Die B) (p.p.i./kN/m) | 58/10 | 112/20 | 17/3 |
| Water Contact Angle (°) | 65 | 80 | 90 |
| Water Absorption (%) | 17.8 | 6.6 | 5.0 |
| % Luminous Transmittance 100 mil (2.54 mm) | 92.6 | 88 | 85 |
| $P_O$ (1) | 2.44 | 20.5 | 33.3 |
| $P_N$ (1) | 0.807 | 8.95 | 14.8 |
| $P_{CH}$ (1) | — | 33.38 | — |
| $P_{CO}$ (1) | — | 131 | — |
| $P_O/P_N$ | 3.02 | 2.29 | 2.25 |

(1) Figure reported is $\times 10^9$ cm$^3 \cdot$ cm/cm$^2 \cdot$ sec $\cdot$ cm Hg

EXAMPLES 22–24

In these Examples, a combination of block copolymer prepolymers was employed to produce a cured elastomers and the water contact angle of each molded against a cellulose acetate or a polytetrafluoroethylene substrate was measured. Examples 23 and 24 are comparative examples. In these examples, a small amount of a block copolymer prepolymer of the average formula

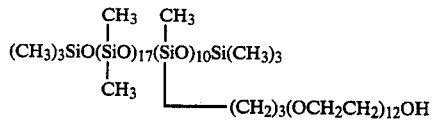

was employed (BCP-7) as a reactive cross-linker due to the multiple polyethyleneoxy units present in BCP-7. Examples 22–24 each contained 100 g BCP-1, 20 g BCP-7 and 28 g IEM as part of their composition. The remainder of each composition was as follows: Example 22 additionally contained 50 g MMA, 0.04 g DBTDL and 0.2 g Peroxide A; Example 23 additionally contained 148 g MMA, 0.06 g DBTDL and 0.3 g Peroxide A; and Example 24 additionally contained 0.03 g DBTDL and 0.15 g Peroxide A. Each composition was prepared by adding the IEM and the DBTDL to a mixture of the BCP-1 and BCP-7, stirring the mixture for two minutes and allowing the mixture to stand for 15 minutes at room temperature (about 21°±2° C.). Then the MMA was added with stirring in Examples 22 and 23 followed by the Peroxide A. Each composition was de-aired, placed in a molding chase lined with polytetrafluoroethylene paper and heat/press cured at 150°–175° C. for 20 minutes. Example 24 contained no MMA and only Peroxide A was added to the mixture after standing at room temperature; the composition was de-aired, placed in a molding chase lined with cellulose acetate film and heat/press cured at 150°–175° C. for 20 minutes.

The cured elastomer of Example 22 which was formed from a composition containing 25% MMA had a water contact angle of 66° while the cured elastomer of Example 23 which was formed from a composition containing 50% MMA had a water contact angle of 83° which is slightly above that required to be considered as being hydrophilic. The water contact angle was measured after the drop was in contact with the elastomer for 9 minutes in a closed container. Example 24, with no MMA, was cured against cellulose acetate instead of polytetrafluoroethylene as were Examples 22 and 23 and had a contact angle of 26° after 8 minutes exposure to the water droplet (i.e., the elastomer is hydrophilic) whereas the contact angle was 49° after two minutes exposure. This latter behavior indicates that the cured elastomer is water absorptive as well as hydrophilic.

EXAMPLE 25

This example demonstrates the use of ionizing radiation sources to cure compositions of the present invention via a free radical polymerization mechanism.

An ultraviolet light source was employed to cure a composition of the type described in Example 8 as follows. A curable composition (Base 1) was prepared as in Example 8, but no peroxide was added. Four samples were prepared. Sample A was Base 1 with no further additives. Sample B was a mixture of 10 g of Base 1 with 0.05 g benzophenone (0.5 weight %). Sample C was a mixture of 10 g of Base 1 with 0.1 g benzophenone (1 weight %) and Sample D was a mixture of 10 g of Base 1 with 0.2 g benzophenone (2 weight %). The benzophenone was added as a photoinitiator. The ultraviolet light source was an Ace-Hanovia 1 liter Photochemical Reactor No. 6533, 100 watt, medium pressure Mercury Immersion Lamp commercially available from Hanovia Lamp Division, Conrad-Hanovia, Inc., Newark, N.J. 07105. Each sample composition was introduced into a small quartz test tube which was then taped to the outside surface of the ultraviolet light source and the irradiation of each sample was carried out at room temperature under a nitrogen atmosphere. Samples A through D remained fluid after 4 minutes of irradiation. All four samples were found to be cured to transparent elastomers after a total of 8 minutes of irradiation. The cured surface of Sample A was found to be very dry and not sticky to the touch. Sample A was rather warm to the touch after 8 minutes while the temperature of the other three samples only increased slightly after 8 minutes of irradiation. Sample B with 0.5% benzophenone appeared to polymerize the fastest of Samples B–D suggesting that a photoinitiator may not be necessary particularly in view of the fact that Sample A, with no photoinitiator, also cured to an elastomer in 8 minutes.

A composition of the same formulation as Sample A was prepared and samples (Sample E and Sample F) of that composition were irradiated using an electron beam apparatus capable of generating a 2 Million electron volt beam of electrons. Sample E was irradiated in the presence of air and after absorbing a total of 2 megarad (i.e., 200 ergs per gram of sample) of energy, the composition remained fluid. After receiving 5 megarad of energy, the composition had hardened in the lower portion of the sample, but the top portion of the composition (which was in contact with air) remained fluid. Sample F was irradiated in the presence of nitrogen gas and the composition had cured to a soft elastomer having a dry surface after absorbing 2 megarad of energy. The composition had cured to a strong elastomer having a dry surface after absorbing 4 megarad of energy.

That which is claimed is:

1. A composition curable to a water-absorbing hydrophilic silicone-organic copolymer elastomer consisting essentially of
(A) from 50 to 95 parts by weight of at least one block copolymer of the formula

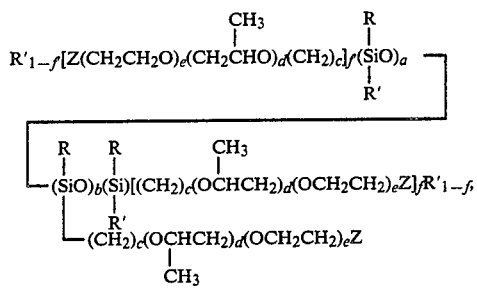

wherein
a is an integer of from 4 to 49, inclusive,
b is an integer of from 0 to 15, inclusive,
c is an integer having a value of from 2 to 4, inclusive,
d is an integer of from 0 to 25, inclusive,
e is an integer of from 5 to 50 inclusive
d+e is no greater than 50 and e is greater than or equal to d,
f is 0 or 1,
f' is 0 or 1,
f+f'+b is at least 2,
R is a monovalent hydrocarbon or halohydrocarbon radical of from 1 to 6 inclusive carbon atoms which is free of aliphatic unsaturation,
R' is a methyl or a phenyl radical,
Z is a monovalent radical selected from the group consisting of $CH_2=CR''COOR'''NHCOO-$, and $CH_2=CR''COO-$,
R'' is an alkyl radical of from 1 to 4 inclusive carbon atoms or hydrogen,
R''' is a divalent hydrocarbon radical of from 1 to 6 inclusive carbon atoms, and
(B) from 5 to 50 parts by weight of at least one substantially water insoluble aliphatically unsaturated organic monomer which is compatible with said (A), wherein upon curing said composition, an elastomer is obtained which is hydrophilic and capable of absorbing at least 3% by weight of water based upon the total weight of said elastomer before exposure to water.

2. The composition as claimed in claim 1 wherein said (B) is at least one monomer of the formula

Wherein W is selected from the group consisting of $-COOR''''$, $-OOCCH_3$ and $-C_6H_5$ wherein $R''''$ is an alkyl radical of from 1 to 6 inclusive carbon atoms.

3. The composition as claimed in claim 2 wherein a is an integer of from 8 to 14, inclusive, c is 3 or 4, d is 0, e is an integer of from 10 to 20, inclusive, R is a methyl, phenyl or 3,3,3-trifluoropropyl radical, and Z is $CH_2=CR''COO(CH_2)_2NHCOO-$.

4. The composition as claimed in claim 3 wherein R and R' are each methyl radicals and wherein said composition contains from 30 to 50 parts by weight of said (B).

5. The composition as claimed in claim 3 wherein b is 0.

6. The composition as claimed in claim 5 wherein R and R' are each methyl radicals.

7. The composition as claimed in claim 3 wherein said composition contains from 30 to 50 parts by weight of said (B) and said (B) is selected from the group consisting of $CH_2=CCH_3COOCH_3$, $CH_2=CHC_6H_5$ and mixtures thereof.

8. The composition as claimed in claim 6 wherein said composition contains from 30 to 50 parts by weight of said (B) and said (B) is selected from the group consisting of $CH_2=CCH_3COOCH_3$, $CH_2=CHC_6H_5$ and mixtures thereof.

9. The composition as claimed in claim 1 which additionally includes from 0.1 to 10 parts by weight per 100 parts of (A) and (B) of a free radical initiator.

10. The composition as claimed in claim 3 which additionally includes from 0.1 to 10 parts by weight per 100 parts by weight of (A) and (B) of a free radical initiator.

11. The composition as claimed in claim 4 which additionally includes from 0.1 to 10 parts by weight per 100 parts by weight of (A) and (B) of a free radical initiator.

12. The composition as claimed in claim 6 which additionally includes from 0.1 to 10 parts by weight per 100 parts by weight of (A) and (B) of a free radical initiator.

13. A water-absorbing, hydrophilic silicone organic elastomer comprising a polymerization product formed after maintaining the composition of claim 1 under free radical polymerization conditions for a sufficient amount of time to obtain said polymerized product.

14. A water-absorbing, hydrophilic silicone organic elastomer comprising a polymerization product formed after maintaining the composition of claim 3 under free radical polymerization conditions for a sufficient amount of time to obtain said polymerized product.

15. A water absorbing, hydrophilic silicone organic elastomer comprising a polymerization product formed after maintaining the composition of claim 4 under free radical polymerization conditions for a sufficient amount of time to obtain said polymerized product.

16. A water-absorbing, hydrophilic silicone organic elastomer comprising a polymerization product found after maintaining the composition of claim 6 under free radical polymerization conditions for a sufficient amount of time to obtain said polymerized product.

17. A water-absorbing, hydrophilic silicone organic elastomer comprising a polymerization product obtained upon polymerizing the composition of claim 9.

18. A water-absorbing, hydrophilic silicone organic elastomer comprising a polymerization product obtained upon polymerizing the composition of claim 10.

19. A water-absorbing, hydrophilic silicone organic elastomer comprising a polymerization product obtained upon polymerizing the composition of claim 11.

20. A water-absorbing, hydrophilic silicone organic elastomer comprising a polymerization product obtained upon polymerizing the composition of claim 12.

21. A membrane comprised of the water-absorbing, hydrophilic silicone organic elastomer of claim 13.

22. A membrane comprised of the water-absorbing, hydrophilic silicone organic elastomer of claim 14.

23. A membrane comprised of the water-absorbing, hydrophilic silicone organic elastomer of claim 15.

24. A membrane comprised of the water-absorbing, hydrophilic silicone organic elastomer of claim 16.

* * * * *